United States Patent [19]

Miller

[11] Patent Number: 4,899,221

[45] Date of Patent: Feb. 6, 1990

[54] TELEVISION SIGNAL PROCESSING APPARATUS INCLUDING RISE TIME NORMALIZATION AND NOISE REDUCTION

[75] Inventor: William G. Miller, Knoxville, Tenn.

[73] Assignee: North American Philips Consumer Electronics Corp., Knoxville, Tenn.

[21] Appl. No.: 311,439

[22] Filed: Feb. 15, 1989

Related U.S. Application Data

[63] Continuation of Ser. No. 941,498, Dec. 15, 1986, abandoned.

[51] Int. Cl.$^4$ .............................................. H04N 9/64
[52] U.S. Cl. ..................................... 358/167; 358/166; 358/37
[58] Field of Search ................... 358/167, 166, 36, 37, 358/174

[56] References Cited

U.S. PATENT DOCUMENTS

| | | | |
|---|---|---|---|
| 3,487,163 | 12/1969 | Brugler | 358/174 |
| 3,715,477 | 2/1973 | Olson et al. | 358/167 X |
| 4,009,334 | 2/1977 | Sypula | 358/167 |
| 4,071,782 | 1/1978 | Vidovic | 358/37 X |
| 4,142,211 | 2/1979 | Faroudja | 358/167 |
| 4,249,202 | 2/1981 | Perry et al. | 358/167 X |
| 4,263,616 | 4/1981 | Lee | 358/166 |
| 4,386,369 | 5/1983 | Shanley, II et al. | 358/166 |
| 4,386,370 | 5/1983 | Harwood et al. | 358/166 |
| 4,437,124 | 3/1984 | Cochran | 358/166 |
| 4,441,121 | 4/1984 | Harwood et al. | 358/36 |
| 4,509,080 | 4/1985 | Lagoni et al. | 258/167 X |
| 4,520,396 | 5/1985 | Dischert et al. | 358/167 |
| 4,538,236 | 8/1985 | Dischert et al. | 358/166 X |
| 4,602,278 | 7/1986 | Pritchard et al. | 358/36 X |

FOREIGN PATENT DOCUMENTS

54-16919  2/1979  Japan .................................. 358/174

OTHER PUBLICATIONS

John P. Rossi, Digital Techniques for Reducing Television Noise SMPTE, Journal, Mar. 1978, vol. 87, pp. 134–140.

Primary Examiner—James J. Groody
Assistant Examiner—Mark R. Powell
Attorney, Agent, or Firm—Edward W. Goodman

[57] ABSTRACT

The coring circuit in a luminance processor has a characteristic which starts at the O input/O output point and extends linearly in both a positive and negative direction. The characteristic is implemented by a linear amplifier from which the input luminance signal is blocked until it has reached a predetermined threshold amplitude. Low amplitude, high frequency noise is therefore removed without causing overpeaking at high transition levels. The coating stage is preceded in the signal processor by a circuit which furnishes a peaking signal whose rise and fall time are independent of the amplitude of the transition. This circuit is implemented by feeding back the peaked luminance signal through a first filter which has a cut-off at 4 MHz and therefore furnishes a signal responsive both to the change in amplitude and the rate of change of that amplitude, and a second filter whose output is proportional only to the change in amplitude. The output of the second filter is subtracted from that of the first, so that the resultant gain control signal varies only as a function of the transition time. This gain control signal is then applied to a gain control amplifier in the forward loop. The feedback operates to keep the transition times constant.

9 Claims, 3 Drawing Sheets

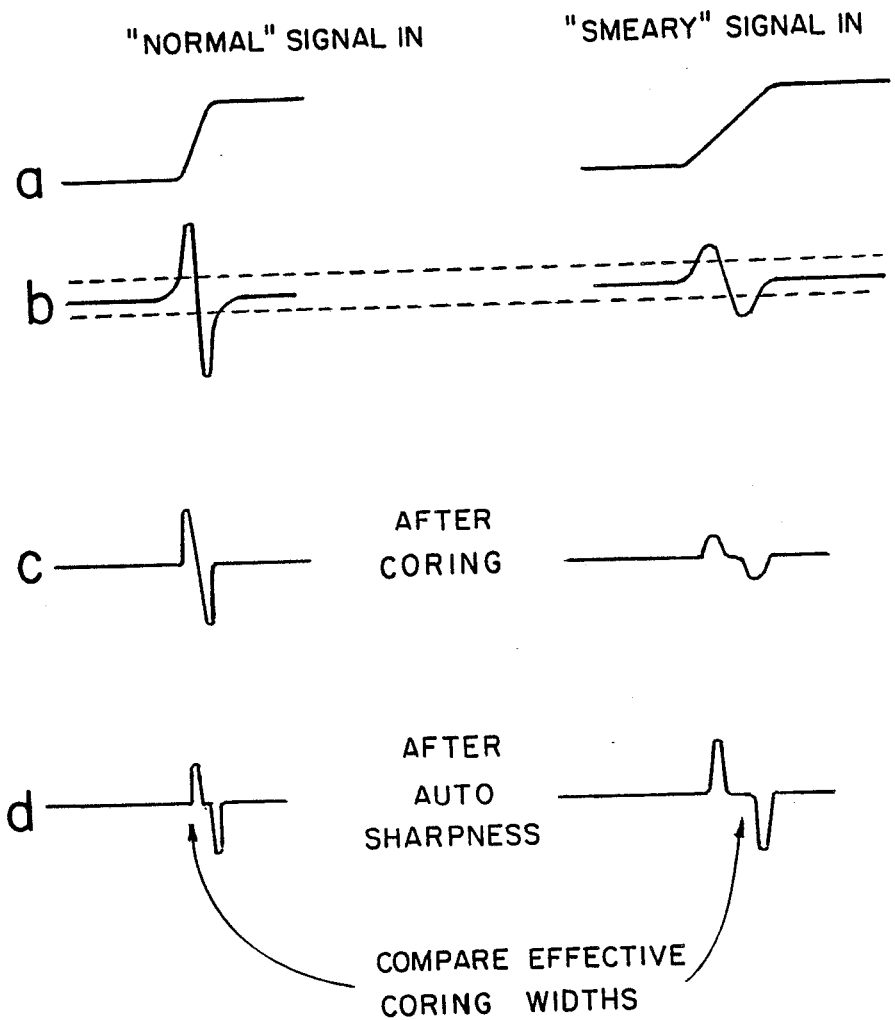

TELEVISION SIGNAL PROCESSING APPARATUS INCLUDING RISE TIME NORMALIZATION AND NOISE REDUCTION

This is a continuation of application Ser. No. 941,498, filed Dec. 15, 1986, now abandoned.

BACKGROUND OF THE INVENTION

1. Field of the Invention

The present invention relates to television signal processing apparatus and, more particularly, to luminance signal processing apparatus including rise time normalization and high frequency noise attenuation.

2. Background of the Disclosure

A well known technique for reducing the low level background noise in video signals is to selectively remove (or at least attenuate) high frequency, low amplitude signal components. One type of television receiver luminance processor, the removal is accomplished by subtracting a fixed offset from all levels of the sharpness or peaking signal. The transfer characteristic of an amplifier used for this purpose in the known processor is illustrated in FIG. 1. In that figure, solid line a is a plot of peaking signal as a function of received signal. Dashed line b runs parallel to line a and indicates the same transfer characteristic, but without the fixed offset. Vertical line a indicates the magnitude of offset, or, in other words, the amount by which the viewer must increase the sharpness of peaking signal on mid-level transitions in order to achieve the same sharpness as he would have had with a linear transfer without offset. Line d shows the transfer characteristic at this increased level.

It will be noted that this characteristic results in excess peaking at high level transitions as indicated by vertical line e. This overpeaking is undesirable.

A further, related problem results from the fact that, in presently known luminance processors, the user-selected peaking level discussed above is maintained by monitoring the maximum amplitude of the first or second derivative of the peaked luminance signal over a whole scene, and then holding this quasi-DC level constant by means of negative feedback to a gain controlled amplifier. This method works well on scenes which contain the same magnitude of maximum luminance step, e.g. test patterns. It does not yield acceptable results for the usual video picture material. If the sharpness control is initially set for a pleasing picture on "average" scene material, screens having full transitions tend to be under peaked, while those with minimal transitions (e.g. a fade to black) tend to be overpeaked and noisy.

Finally, it was found that in a known television receiver, the coring and auto-sharpness circuits described above are cascade-connected with the coring circuit preceding the auto-sharpness circuit. Resulting waveforms for the case of a normal incoming vides signal and a smeary incoming video signal are shown on the left-hand side of FIG. 2, and on the right-hand side of FIG. 2, respectively. It will be noted that the smeary picture would have a peaking signal (line b) of lower amplitude. The waveforms after coring in the respective cases are shown in line c. It will be noted that the smeary incoming signal results in a relatively large zero output peaking signal between the positive and negative half cycles, since a fixed amplitude core has been taken out. As illustrated in line d, the output of the known auto-sharpness circuit receiving the known coring signal illustrated in line c would have different effective coring widths depending upon the type of signal received. The coring width for the smeary signal may well be too wide to be acceptable.

SUMMARY OF THE INVENTION

It is an object of the present invention to furnish apparatus maintaining a selected peaking level, but which does not result in the underpeaking and overpeaking of the known luminance processor. Finally, it is an object of the present invention to teach the interconnection of the above-mentioned circuits so that the excessive coring width which might otherwise occur is prevented.

The coring circuit used with the present invention, prevents overpeaking on high level transition resulting from use of the coring circuit described above by applying the incoming video signal to a linear amplifier whose amplification starts at the zero input/zero output voltage point. This linear amplifier is gated on when the incoming signal exceeds a predetermined threshold level and is gated off when the incoming signal level is below this threshold. Preferably, the gating circuit is responsive to the absolute value of the input signal amplitude. With this circuit the television viewer may set the sharpness level at any point without creating overpeaking at any other point.

The apparatus according to the present invention further comprise circuitry which furnishes a television peaking signal with substantially constant transition times independent of the amplitude of the transitions. A signal processor including a gain controlled amplifier receives the incoming video signal which undergoes transitions having varying amplitudes and varying periods. A first feedback circuit generates a feedback signal which has an amplitude varying as a function of both the transition amplitudes and the transition time. A second feedback circuit generates a second feedback signal which has an amplitude independent of the transition time but varying as a function of the transition amplitude. A gain control signal is derived from the two feedback signals by subtracting the second from the first. The resultant gain control signal is independent of the transition amplitude. When this gain control signal is applied to the gain control amplifier to control the gain thereof, the resulting video output signal is a television peaking signal having substantially constant transition times independent of the amplitude of the transitions.

Further, in accordance with the present invention, the above described rise time normalization circuit (64, 66, 68, 78, 86) is connected prior to the non-linear noise coring circuit in the direction of signal flow. The non-linear circuit therefore operates on video signals having more uniform transition times and the possibility of excessive coring widths is prevented.

The present invention, as well as additional features and objects thereof, will be better understood with reference to the following description taken in conjunction with the below-described drawing.

BRIEF DESCRIPTION OF THE DRAWING

FIG. 2 shows waveshapes resulting from prior art incorrect connection of coring and auto-sharpness circuits;

DESCRIPTION OF THE PREFERRED EMBODIMENT

Figure 1:
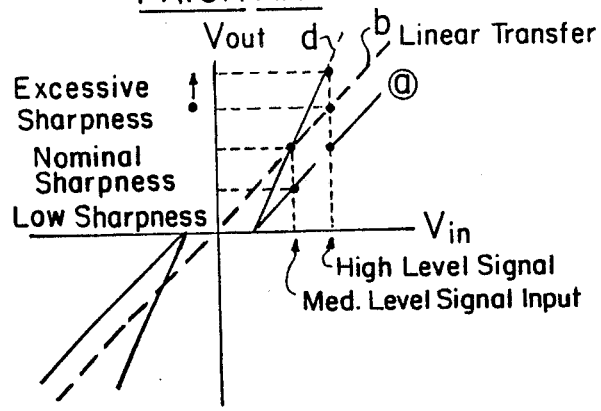
FIG. 1 shows the transfer characteristic of a known coring circuit.
Figure 3:
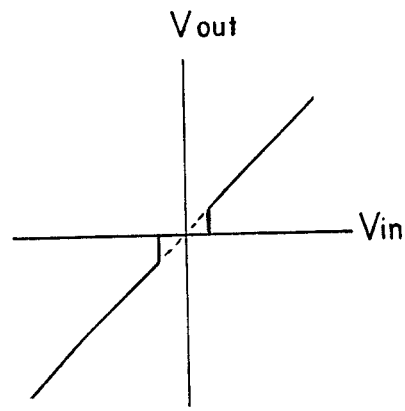
FIG. 3 illustrates the transfer characteristic of the coring circuit according to the present invention.

The coring or noise reduction circuit according to the present invention has a transfer characteristic as illustrated in FIG. 3. It will be noted that the characteristic contains two points of inflection of each polarity and will provide, for signals exceeding some absolute value, the same signal as a linear transfer characteristic.

This characteristic is simple to implement by use of a transmission gate, switch or amplitude modulator which blocks the peaking signal as long as the absolute value of the input signal amplitude is less than a predetermined threshold amplitude.

Figure 4:
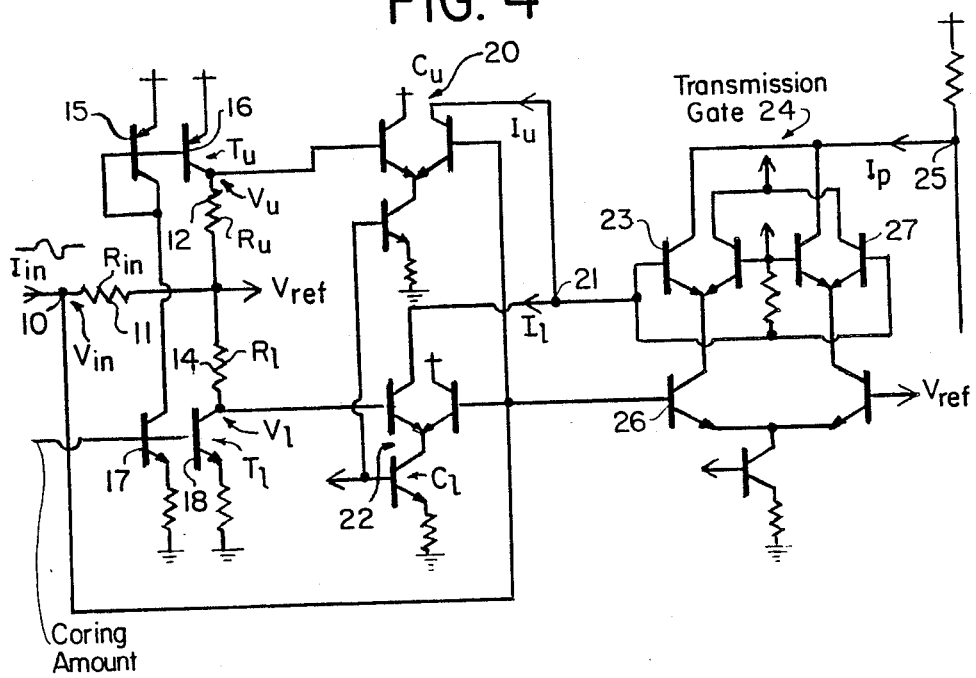
FIG. 4 is a schematic circuit diagram of a coring circuit according to the present invention.

In the coring circuit diagram of FIG. 4, the luminance current is denoted by $I_{in}$. It creates a potential $V_{in}$ at an input terminal 10. Terminal 10 is connected to reference potential (e.g. $\frac{1}{2}V_{CC}$ volts) via a resistor 11. Two resistors, 12 to 14 have a common point connected to $V_{ref}$. The other ends of resistors 12 and 14, respectively, are connected to the emitter-collector circuit of a respective transistor, 16 and 18. An external coring threshold adjustment set by the viewer (see also FIG. 5 coring amount input) controls the bias applied to the respective transistor bases, directly in the case of transistor 18, and via transistors 15 and 17 connected in parallel with transistors 16 and 18 in the case of transistor 16.

$V_{in}$ is also applied to one side of a first comparator 20 and a second comparator 22. The other comparing input of comparator 20 is connected to receive the voltage $V_u$ at the collector of transistor 16. The other comparing side of comparator 22 is similarly connected to receive the voltage $V_1$ at the collector of transistor 18. The comparator outputs are respectively connected to the base of a transistor 23 and the base of a transistor 27, which form part of a transmission gate 24. The output of the transmission gate 24 is available at a terminal 25. As illustrated in the overall block diagram shown in FIG. 5, this output is then combined with the incoming luminance signal after optional shoot limiting. A shoot limiting circuit is not essential to an understanding of the present invention. It will therefore not be discussed here.

The above-described circuit operates as follows:

User adjustment of the external coring adjustment (coring amount) changes the bias on transistor 18 and transistor 16. The current flow through the two transistors is changed, in turn, changing the voltage drop across resistors 12 and 14. Voltages $V_u$ and $V_1$ change accordingly. Voltage $V_u$ is applied to one side of comparator 20, the other side of comparator 20 receiving voltage $V_{in}$. An output current $I_u$ flows only when voltage $V_{in}$ is more positive than voltage $V_u$. On the other hand, voltage $V_1$ is applied to one side of comparator 22 whose other side also receives voltage $V_{in}$. However, current $I_1$ flows only when voltage $V_{in}$ is more negative than voltage $V_1$. All bases of the transistors constituting transmission gate 24 are balanced when current $I_u$ and current $I_1$ are both zero. Either current $I_1$ or current $I_u$ will bias the transmission gate 24 to the "on" state. Since $V_{in}$ is applied to the base of transistor 23, and the collector of this transistor is connected to the input of transmission gate 24, variations in $V_{in}$ will result in corresponding variations at output 25 of transmission gate 24 as long as either current $I_u$ or a current $I_1$ flows, i.e. as long as the magnitude of $V_{in}$ exceeds a predetermined threshold value. The output current signal, $I_p$, available at 25 is a peaking signal adjusted in accordance with the viewers wishes and substantially free of high frequency low amplitude noise.

Figure 5:
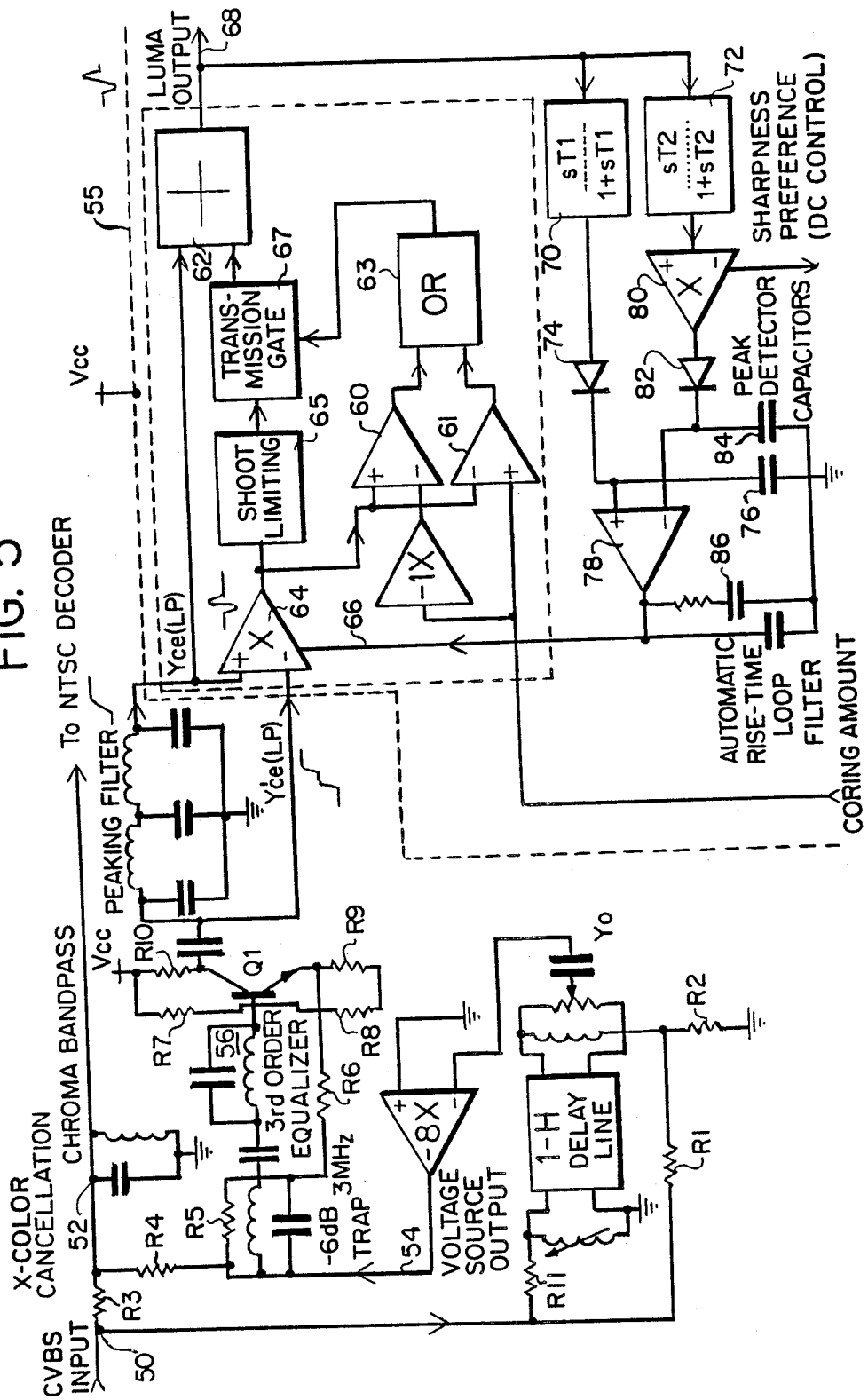
FIG. 5 is a block diagram illustrating a luminance processor including the present invention.

The overall luminance processor including the present invention is illustrated in block diagram form in FIG. 5. In FIG. 5, the CVBS video signal input is received at a terminal 50. The chroma and luminance signals are separated by circuitry which is not part of the present invention. The chrominance signal is available at a terminal 52, while a restored combed luminance signal is furnished on a line 54. The luminance signal is subjected to frequency response equalization in a circuit generally denoted by reference numeral 56, and coupled through a coupling network and a peaking filter to the luminance processor. The part of the luminance processor which includes the present invention is enclosed in dashed lines and generally designated by reference numeral 55. The peaking processor receives the luminance signal and applies it directly to a summing circuit 62. In addition, it receives from external peaking filter circuitry a peaking input signal suitable for generation of a peaking signal. In this example, FIG. 5, it is the difference between $Y_{CE(LP)}$ and $Y'_{CE(LP)}$. The peaking input signal is applied to a gain controlled amplifier 64, which receives a gain control signal on a line 66. The output of amplifier 64 is applied to two threshold comparators shown in detail in FIG. 4 and discussed above. The threshold comparators are denoted by reference numeral 60 and 61, respectively in FIG. 5. The outputs of the threshold comparators are connected through an OR gate 63 constituted by node 21 in FIG. 4 to a transmission gate 67.

The output of stage 64 is also applied to a shoot limiting amplifier stage (not part of this invention) whose output is applied to transmission gate 67. The output of transmission gate 67 is applied to the second input of summing stage 62. The coring, shoot limiting stage, if any, and summing circuit 64 are referred to as additional means herein. Together with amplifier 62 and its associated feedback circuits 70–78 and 86 described below, the additional means constitute a linear rise time normalization circuit. The signal at the summing circuit output, denoted by reference numeral 68, is applied to a first high-pass filter 70 which has a cut-off frequency at approximately 4 MHz. It is further applied to a second high-pass filter 72 which has a cut-off frequency at approximately 250 KHz. The output of filter 70 is connected through a peak detector including a diode 74 and a capacitor 76, to the inverting input of a difference amplifier 78. The output of filter 72 is connected through a gain controlled amplifier 80 and a peak detector, consisting of a diode 82 and a capacitor 84, to the non-inverting input of difference amplifier 78. The output of amplifier 78 as filtered by a capacitor 86 is applied to the control input of gain control amplifier 64.

The above described circuits operate as follows:

The incoming luminance signal is applied to one summing input of summing circuit 62. In addition, the peaking signal to be added to the luminance signal is applied to the second summing input of summing stage 62 via the noise coring circuit. The operation of the latter was described in detail above and will not be repeated here. The output of the summing circuit is fed back via two feedback circuits. The first is a high-pass filter 70 (part of first feedback means). Due to its high cut-off frequency, namely 4 MHz, the output of this filter will have components which vary both as a function of the amplitude of the particular transition and the rate of change of that amplitude, i.e. the time required to accomplish the transition. On the other hand, the signal at the output of filter 72, part of the second feedback means, will vary substantially only as a function of the change in amplitude undergobne by the signal during the transition. Following peak detection, the output of filter 70 is subtracted from that of filter 72 in difference amplifier 78. Difference amplifier 78, high-pass filter 70 and high-pass filter 72 together with their associated circuitry constitute feedback means. The gain control signal at the output of difference amplifier 78 is thus a signal which varies as a function of the time required to accomplish the transition, independent of transition amplitude. Since the feedback loop will tend to keep this signal constant, the time required for the transition, i.e. the rise or fall time of the peaked luminance signal at the output of circuit 62, will be substantially independent of the change in amplitude involved.

It should also be noted that gain controlled amplifier 64 precedes the coring circuit in the signal processing chain. This sequence of operation thus minimizes the possibly excessive coring width which would result if it were to be connected after the coring stage.

Although the invention has been illustrated in a particular preferred embodiment, it is not intended to be limited thereto. Many variations in operation and construction will readily occur to one skilled in the art and are intended to be encompassed in the scope of the invention, as claimed in the following claims.

What is claimed:

1. Apparatus for furnishing a desired television signal having substantially constant transition times independent of the amplitude of said transitions, comprising
   gain controlled amplifier means for receiving and amplifying an input signal undergoing transitions having varying transition amplitudes and varying transition times, and furnishing an amplified video signal in response thereto;
   additional means connected to said gain controlled amplifier means for furnishing a video output signal of said apparatus at least in part in response to said amplified video signal;
   feedback means connected to said additional circuit means for generating a gain control signal having an amplitude varying only as a function of said transition times; and
   means for applying said gain control signal to said gain controlled amplifier means to control the gain thereof, whereby said video output signal constitutes said desired television signal.

2. Apparatus as set forth in claim 1, wherein said feedback means comprises first feedback means connected to said additional circuit means for generating a first feedback signal having an amplitude varying for a function of said transition amplitudes and of said transition times, second feedback means connected to said additional circuit means for generating a second feedback signal having an amplitude independent of said transition time but varying as a function of said transition amplitude, and
   means for combining said first and second feedback signal to generate said gain control signal.

3. Apparatus as set forth in claim 1, wherein said additional circuit means comprises summing circuit means having a first and second summing circuit input and a summing circuit output, and signal processing means interconnected between said gain controlled amplifier means and said second summing circuit input;
   further comprising means for applying said input signal to said first summing circuit input.

4. Apparatus as set forth in claim 2, wherein said first feedback means comprises first high-pass filter means having a cutoff frequency above 4 MHz.

5. Apparatus as set forth in claim 2, wherein said second feedback means comprise second high-pass filter means having a cutoff frequency at approximately 250 KHz.

6. Apparatus as set forth in claim 2, wherein said combining means comprises differential amplifier means.

7. Apparatus as set forth in claim 2, further comprising first peak detector means interconnected between said first feedback signal furnishing means and said combining means.

8. Apparatus as set forth in claim 5, further comprising second peak detector means interconnected between said second feedback circuit means and said combining means.

9. Television signal processing apparatus comprising
   rise time normalization circuit means receiving said television signal and generating a normalized rise time signal in response thereto; and
   nonlinear coring circuit means connected to the output of said rise time normalization circuit means for generating a signal having decreased high frequency noise in response to said normalized rise time signal, whereby said rise time normalization circuit means operates independently of nonlinearities in said nonlinear coring circuit means.

* * * * *